United States Patent Office 3,524,006
Patented Aug. 11, 1970

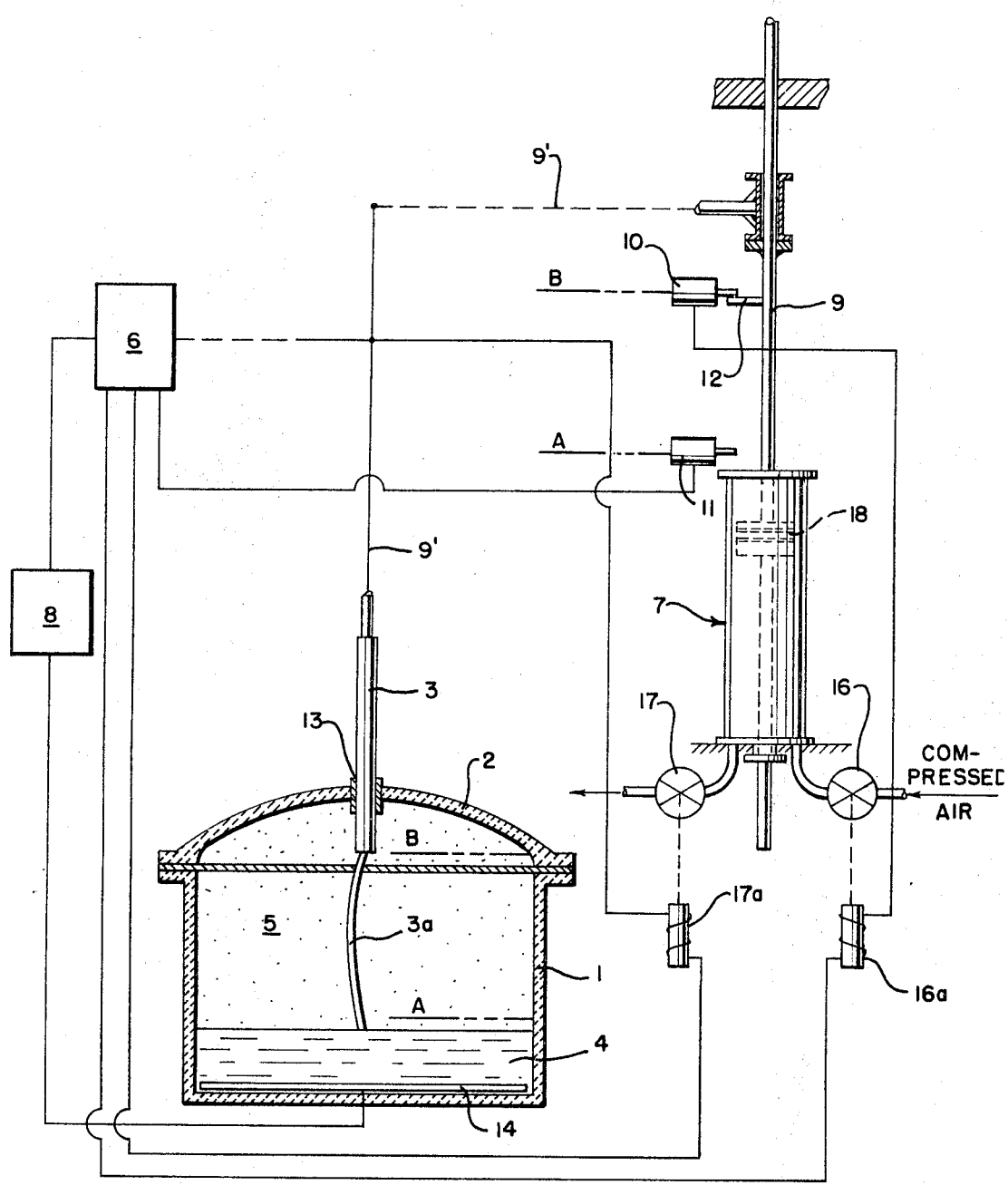

3,524,006
METHOD AND APPARATUS FOR CONTROLLING ARC DISCHARGE IN PLASMA ARC FURNACES
Fred Ebeling and Werner Jakobs, Berlin, Erich Mumme, Falkensee, Herbert Hoffmann and Helmfried Jeske, Hennigsdorf and Karl Spiegelberg, Berlin, Germany, assignors to VEB Qualitats- und Edelstahl-Kombinat, Hennigsdorf, near Berlin, Germany
Filed Oct. 19, 1967, Ser. No. 676,413
Int. Cl. H05b 7/10
U.S. Cl. 13—34                     11 Claims

ABSTRACT OF THE DISCLOSURE

In a plasma arc furnace the burner electrode is lowered toward the melting deposit. In the movement of the arc ignition, the electrical variation in the electrode circuit triggers a controlling means which abruptly reverses the movement of the burner electrode and stretches the plasma arc to a fixed predetermined length.

---

For melting metallic bulk raw materials, such for instance as steel, industrial melting furnaces have been employed wherein melting heat energy is supplied to the metal deposit to be melted either by an oxidation process, as for example in Siemens-Martin furnace, or by means of electrical heat, which has been usually produced in an electric arc furnace. The best control in the former type of furnace is carried out by adjusting the fuel supply, whereas that in the arc furnace by regulation of electric current. In the latter furnace, however, sudden variations of the arc current intensity have occurred during the melting, usually due to changes of the arc length.

To eliminate said variations, the electric arc furnaces have been equipped with an electrode controlling device which either controls electrode current or, in a different mode of operation regulates the impedance of the current circuit to maintain the circuit resistance at a constant value, taking advantage of the field intensity gradients along the axis of the arc. The electrode axial motion required for the latter operation has been performed either by a hydraulic device or by electromotors controlled for example by relay switches, by magnetic amplifiers or by Ward Leonard arrangement.

The undesired electrode current variations have been also substantially evaded by employment of a plasma arc furnace, the internal atmosphere of which contains a selected gas, for instance argon. Owing to such atmosphere, a plasma arc is produced which has along its axis a very low field intensity gradient; nevertheless at the beginning of the melting process or after an interruption of arc discharge a special control of electrodes is needed in order that the plasma arc might be initiated.

The principal object of the present invention is to provide a new and improved method for controlling burner electrode in a plasma arc furnace independently of the furnace internal atmosphere.

More particularly, the object of the present invention is to enable technologically stipulated interruptions of plasma arc discharge without interrupting the course of melting. Such interruptions are required for instance to deposit supplemental material or to withdraw reaction slag during the melting process and thereby to increase the field of application of plasma arc furnaces for melting metallic and non-metallic materials as well.

In accordance with the present invention, when starting the melting process or after interruption of the arc discharge during the melting process, the distance between the burner electrode and the metal deposit is shortened until the plasma arc ignites. Subsequently, to the moment of ignition, the arc current or voltage is applied to an electrode control system which abruptly reverses the downward movement of the burner electrode and transfers the latter to a predetermined fixed working position. Said control system comprises both electromagnetic means connected in series with the arc current circuit, and pneumatic hydraulic, mechanical or electromechanical driving means for lifting the burner electrode.

The speed of response of said control system has to be adjusted in such a manner as to allow continuous stretching of the plasma arc up to the working distance. At the same time the speed has to be high enough to reduce to a minimum the stay of the burner electrode in the hot zone of the furnace. More particularly the speed of response has to be adjusted with regard to the furnace's geometric dimensions, to its internal atmospheric conditions and with regard to metallurgical requirements of the melting process respectively.

As to the direction of electrode movement, the burner electrode can be moved either vertically to the surface of the melting deposit or at an angle different from 90 degrees.

To keep the electrodes from direct contact with each other and thus to avoid damaging the burner electrode if, for any reason, the arc discharge and in consequence the electrode motion reversal should not occur, a supplemental protection means is installed in the circuit of the furnace.

In order that the present invention might be readily carried into effect, it will now be described with reference to the accompanying drawing, wherein the figure shows schematically a front section view of an embodiment of a plasma arc furnace and melt aggregate according to the present invention.

The plasma arc furnace and melt aggregate illustrated in the figure consists of a housing 1 hermetically closed by a roof 2. Metallic deposit 4 to be melted is stocked on the bottom of housing 1 and is electrically connected to one pole of power supply 8 through conductive plate 14. The burner electrode 3 is attached to a rod 9, which passes through an opening 13 in the roof 2 and which is mechanically coupled to a driving mechanism 7. Burner electrode 3 is electrically connected via rod 9 and via current (or voltage) sensitive controlling member 6 with the second pole of power supply 8. Controlling member 6, which is excited by electrical parameters of the arc (e.g. by arc current or by arc voltage) triggers the upward motion of driving mechanism 7. The inside of furnace 1 is filled with gas 5 stipulating the working atmosphere for plasma arc.

To start the arc discharge, driving mechanism 7 lowers the burner electrode 3 toward the metallic deposit 4 as low as to the ignition level A representing the distance at which the arc ignites and the arc current starts flowing. As soon as the current increases to a predetermined value, the controlling device 6 actuates the driving mechanism 7, which abruptly reverses the motion of burner electrode 3 and transfers it as high as to the working level B, representing the working length of the plasma arc 3a. A switching pin 12 is rigidly connected to the rod 9 for the purpose to actuate upper limit switch 10 and lower limit switch 11. The position of upper limit switch 10 corresponds to said working level B at which the burner electrode 3 is to be stopped and mechanically affixed. The position of lower limit switch 11 corresponds to a safety level C which must not be trespassed by burner electrode 3 to avoid short-circuit. Accordingly when the pin 12 switches on the upper switch 10, the left driving mechanism 7 is stopped and mechanically locked at that position. On the contrary if the lower limit switch 11 is switched on, it triggers the control member 6 which consequently reverses the downward movement of burner electrode 3 and transfers it to level B.

Further it will be described the controlling method according to this invention operating with a pneumatical driving mechanism 7. Pneumatical driving mechanism, known from prior art, comprises essentially a compressed air tank, which is connected via upper and lower valve respectively with corresponding ends of an airtight cylinder. Inside of said cylinder works a sliding piston, which is mechanically coupled by rod 9 with burner electrode 3. Controlling valve are electromagnetically operated by control member 6 in such a manner that when upper valve is opened and the lower one closed (or vice versa), the compressed air transfers the piston and consequently the burner electrode 3 downwardly (or upwardly) whereby the speed of response of the piston movement is regulated by adjustment of air pressure in the tank.

To start the arc discharge the upper valve is at first opened and the lower valve closed. The control member 6 is out of action because no current flows through it. In instant when the burner electrode reaches the ignition level A, a plasma arc ignites and a relay in the controlling member 6 actuates electromagnets of air pressure controlling valves, which close the first valve and open the lower one. Consequently the downward motion of the burner electrode 3 is momentarily reversed upwardly and stretches the arc 3a up to the level B where the upper limit switch 10 closes the lower valve and stops the motion.

In the same manner, a hydraulic driving device can be employed, wherein a liquid is used as driving medium instead of air.

It is evident that also other types of driving devices, such for example as mechanical or electromechanical ones are applicable provided their function being in accord with foregoing description.

What is claimed is:

1. In a plasma arc furnace having a movable plasma arc burner electrode, a fixed electrode in contact with a metal deposit to be melted, a gas atmosphere inside the furnace and a power supply for the electrodes, a method of controlling the motion of the burner electrode comprising the steps of lowering the burner electrode to a first predetermined position at a level of arc ignition prior to touching of the metal deposit, initiating a plasma arc reversing the motion of said burner electrode in response to electrical variations in the electrode circuit caused by the ignition of the plasma arc, stopping the reversed motion of said burner electrode in a second fixed position and holding said burner electrode in said second position during the entire melting process.

2. The method according to claim 1 wherein said burner electrode motion is responsive to arc current variation.

3. The method according to claim 1 wherein said burner electrode motion is responsive to arc voltage variation.

4. The method according to claim 1 wherein said burner electrode is moved vertically to said melting deposit.

5. The method according to claim 1 wherein said burner electrode is moved to said melting deposit at an oblique angle.

6. An apparatus for controlling the motion of a movable plasma arc burner electrode in a plasma arc furnace provided with a gas atmosphere, a melting deposit in contact with a fixed electrode, at least one burner electrode and an electrode power supply; comprising means for transferring said burner electrode toward said melting deposit as low as to the distance of plasma arc ignition; lower stopping means for stopping the motion of said burner electrode transferring means at a lower limit position prior to touching of said burner electrode to said metal deposit; a control member responsive to electrical variations in electrode circuit for reversing the motion of said burner electrode transferring means; and upper means for stopping the motion of said burner electrode transferring means in a fixed predetermined upper limit position.

7. The apparatus according to claim 6 wherein said burner electrode transferring means is pneumatic driving device.

8. The apparatus according to claim 6 wherein said burner electrode transferring means is hydraulic driving device.

9. An apparatus for controlling the motion of a plasma arc burner electrode in a plasma arc furnace of the type having a gas atmosphere, a plasma arc burner including the movable burner electrode and a fixed electrode in contact with a metal deposit to be melted, and a power supply operatively connected to said electrodes; said apparatus comprising a reversible driving mechanism, mechanical coupling means for connecting said driving mechanism with the top portion of said burner electrode, electromagnetically operated means for controlling the sense of motion of said driving mechanism, limit switching means operatively arranged in the path of movement of said driving mechanism to define predetermined lower and upper limit positions of said burner electrode relative to said deposit, said lower position spaced above said deposit; an electrical control device connected in the circuit of said electrodes, said control device being responsive to variations of the electrical parameters in said circuit caused by the ignition of the plasma arc and controlling via said electromagnetically operated means; said driving mechanism to move, prior to the ignition and after the interruption of said plasma arc, said burner electrode towards said lower limit position and, after the ignition, of the plasma arc, to reverse the motion thereof and move the burner electrode into the working upper limit position.

10. The apparatus according to claim 9 wherein said driving mechanism comprises a pneumatically operated piston controlled by electromagnetically operated inlet and outlet valves in such a manner that, in the position of ignition of the burner electrode, the outlet valve will close and the inlet valve open, and in the upper limit position of the burner electrode both of the valves are closed.

11. The apparatus according to claim 9 wherein said driving mechanism comprises a hydraulically operated piston controlled by electromagnetically operated inlet and outlet valves in such a manner that, in the position of ignition of the burner electrode, the outlet valve will close and the inlet valve open, and in the upper limit position of the burner electrode both of the valves are closed.

References Cited

UNITED STATES PATENTS

| 2,804,493 | 8/1957 | Morey | 13—13 |
| 3,147,329 | 9/1964 | Gage | 13—9 |
| 3,361,862 | 1/1968 | Sturrock et al. | 13—1 |

BERNARD A. GILHEANY, Primary Examiner

R. N. ENVALL, JR., Assistant Examiner

U.S. Cl. X.R.

13—1; 75—10, 49, 60